J. M. STARR.
Mechanisms for Stopping and Starting Street-Cars.
No. 144,484. Patented Nov. 11, 1873.
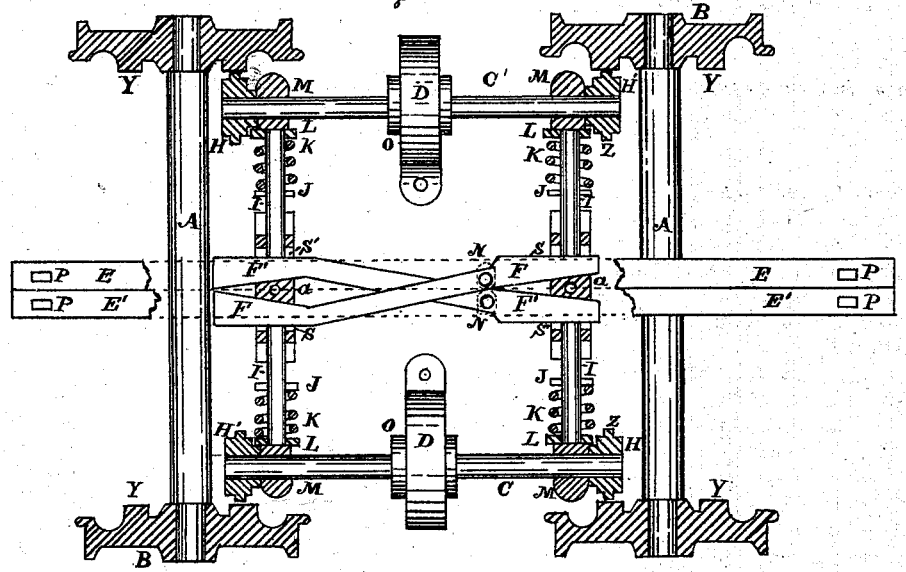
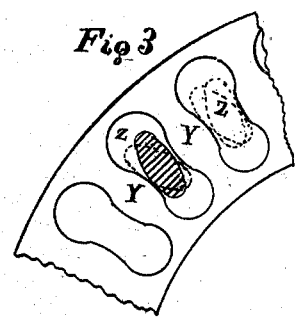
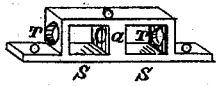
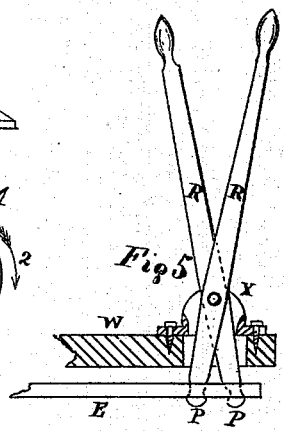
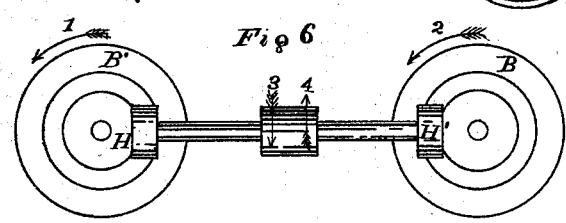
Witnesses
Caleb Elliott.
O. Ben. Hunt
Inventor
James M. Starr
By
J. B. Hunt & Co
Atty's

UNITED STATES PATENT OFFICE

JAMES M. STARR, OF RICHMOND, INDIANA.

IMPROVEMENT IN MECHANISMS FOR STOPPING AND STARTING STREET-CARS.

Specification forming part of Letters Patent No. 144,484, dated November 11, 1873; application filed October 17, 1873.

*To all whom it may concern:*

Be it known that I, JAMES M. STARR, of Richmond, county of Wayne and State of Indiana, have invented certain Improvements in Brakes and Starters for Street-Railroad and other Vehicles, of which the following is a specification:

My invention relates to an improved brake and starter for street-railroad and other vehicles, said brake and starter being operated by means of coiled springs, arranged in such a manner as to be wound or tightened by the momentum of the vehicle, and locked when wound, the power of the springs being held in store to be exerted in starting the car or other vehicle, in a manner hereinafter described.

Figure 1 is a plan or top view, partly in section, showing the manner of shipping and unshipping the mechanism that operates the springs. Fig. 2 is a perspective view of the block which holds in place the inner ends of the shifting-rods I I, Fig. 1. Fig. 3 is a section of the wheel B, showing the convexo-convex teeth of the wheels and pinions working in them. Fig. 4 is a cross-section of the drum O with the coiled spring D attached. Fig. 5 is a side elevation of the levers which operate the shifting-bars; also showing the manner of attaching the same. Fig. 6 is a view of two of the wheels with the drum-shaft attached, showing the operation of the drum-shaft, with friction-wheels attached, instead of toothed wheels; also showing the manner of applying either friction or toothed wheels to the front side of one axle and to the rear side of the other. Fig. 7 is a view of the block which works within the center of the block, Fig. 2, for the purpose of taking up all lost motion, and making the friction-wheels all act conjointly on the wheels B when such friction-wheels are used instead of toothed wheels.

A A are the axles of the car or other vehicle. B B are the wheels. C C are the drum-shafts, to which the drums O O and springs D D are attached, said springs being attached at their outer ends to the body of the vehicle, and at their inner ends to the drum O, as seen in Fig. 4, by means of the catch V, on the inner end of the spring, falling into the ratchet-shaped recess U in the drum O. When the drum is turned in the direction of the arrow 1, it will be seen that the ratchet-recess on the drum will catch against the end of the spring and wind it up; but, if the drum should be inadvertently turned in the direction shown at arrow 2, from any cause, it will simply revolve backward in the spring without injury to the same. The drawings, Fig. 1, are supposed to represent a street-railroad car, the wheels B B of which have convexo-convex teeth, as shown at Y, Fig. 3. This construction of the teeth is for the purpose of allowing the drum-shaft C to rise above or fall below the horizontal center of the axles A A, and the pinions H H remain in gear properly with the wheels B B; or, one end of the drum-shaft may fall below the center of the axle A, and the other end rise above the center of the axle at the same time, yet they both remain in gear properly; or, both ends of the drum-shaft may fall below the center of the axle at the same time, or both ends rise above, and in any event remain in gear properly. The teeth of the pinions H H are made convexo-convex in like manner as the teeth Y of the wheels B. By reference to Fig. 3, it will be seen that the metal is left standing around the teeth of the wheels B; or, in other words, the teeth of the pinions work in slots, whose outer ends are enlarged to form the convexo-convex teeth; or the faces of the wheels B, occupied by the teeth Y, may be made smooth, and smooth wooden-faced friction-wheels, as shown at H and H', Fig. 6, may be attached to the drum-shaft C, (which latter arrangement I prefer in most cases, though not altogether,) and operate not only to wind the springs D, but also act as a friction-brake when needed for that purpose. The ends of the drum-shafts C C rest in bearings M M, which bearings are attached to the shifting-rods I I. Said shifting-rods pass through the bearings L L attached to the body of the vehicle. The inner ends of the shifting-rods pass into the holes T in the block, Fig. 2, which block is also attached to the body of the vehicle. Spiral springs K K are placed around the shifting-rods I I, and held in proper position by means of the pins J J passing through said rods. Thus it will be seen that the tendency of the springs K K is to throw the pinions H out of gear from the wheels B B. The shifting-wedges F F F' F' pass into the mortises S S in the central block a, Figs. 1 and 2, and against the ends of the shifting-rods I I. The block, Fig. 7, is placed loosely in the center of the block a, Fig. 2, for the purpose of taking up all lost motion of the shifting-rods and their bearings. The shifting-wedges press against the ends of the shifting-rods on one side, and against the block, Fig. 7, on the other side of the wedge, said blocks having a slot, through which a screw or pin passes, the slot being for the purpose of allowing lateral motion to the block. The shifting-wedges are attached in such a manner as to work diagonally across the vehicle. The wedges F F and F' F' are connected by bars extending from one to the other, as seen in Fig. 1. The shifting-wedges F F' are attached to the shifting-bars E E' by means of the pins N N passing through the wedges and into the slots in the shifting-bars E E', the pins working loosely in said slot. By reference to Fig. 5 the operation will be seen. The levers R R are placed in their bearings X, the lower ends passing into the slots P P in the outer ends of the shifting-bars E E'.

When it is desired to throw in gear the pinions H H, the shifting-bar E' is moved, which moves the wedges F', and the springs D D wound up, both wheels at one end of the vehicle exerting their force on one spring, and both wheels at the other end exerting their force to wind the other spring, the momentum of the vehicle being used to wind the springs D D; and, when thus wound, the other shifting-bar, E, is thrown forward and pushes the pinions H' H' in gear, and locks the vehicle, and holds the springs wound up until it is desired to move forward, when the shifting-bar first thrown in gear is thrown out by means of the levers R R, either one of the levers and shifting-bars being thrown in or out, according to the direction it is desired to start the vehicle.

Fig. 6 shows a distinctive feature of my invention. The pinions or friction-wheels H' being attached in front of the axles of the wheel B, when thrown in gear with said wheel revolve the drum-shaft in the direction of the arrow 4, and wind the spring D. The pinion or friction wheel H on said drum-shaft, being behind the axle of wheel B', exerts a lifting-force behind the axle of the wheel B' when the pinion or wheel H' is thrown out of gear; thus, in starting, the pinion H imparts a forward motion to the wheel B' in the same direction that the vehicle was going when stopped, the wheel B winding the springs D upon the drum, the spring, in turn, exerting its force when unwinding to move the wheel B' forward in the same direction.

When the vehicle is a street-car, or otherwise, moving in one direction, when it is stopped and it is desired to start in the other direction, when started the levers R R are lifted out and placed in the opposite end of the vehicle, and are operated as before, according to the direction it is intended to move.

Having thus fully described my invention, what I claim, and desire to secure by Letters Patent, is—

1. The pinions H H', provided with the convexo-convex teeth Z, in combination with the wheels B B, having gears Y Y, provided with teeth of the form shown and described, and the springs D, substantially as and for the purpose specified.

2. The drum O, having the recess U, constructed as and for the purpose set forth.

3. The mortised block S S, having the apertures T T, in combination with the shifting-wedges F F', and rods I I, as and for the purpose specified.

4. The shifting-bars E E', in combination with the shifting-wedges F F', rods I I, and pinions H H', substantially as and for the purpose set forth.

5. The combination of the bars E E, wedges F F', rods I I, drum-shafts C C, pinions H H, drums O O, and springs D D, substantially as and for the purpose specified.

6. The combination of the shaft C, pinions H H, and wheels B B', as and for the purpose described.

7. The combination of the block a' with the mortised block S S and the wedges F F', substantially as described.

JAMES M. STARR.

Witnesses:
EDW. W. DOWN,
THOS. T. PARKER.